United States Patent [19]
Yasui et al.

[11] Patent Number: 4,676,923
[45] Date of Patent: Jun. 30, 1987

[54] DICHROIC DYESTUFFS FOR LIQUID CRYSTAL AND LIQUID CRYSTAL COMPOSITION

[75] Inventors: Shigeo Yasui; Masashi Ono; Seiko Kobayashi, all of Okayama; Shigeo Senzai, Kurashiki; Tatsuo Uchida, Sendai, all of Japan

[73] Assignee: Kabushiki Kaisha Nippon Kanko Shikiso Kenkyusho, Okayama, Japan

[21] Appl. No.: 803,516

[22] Filed: Dec. 2, 1985

Related U.S. Application Data

[63] Continuation of Ser. No. 531,121, Sep. 9, 1983, abandoned.

[30] Foreign Application Priority Data

Sep. 13, 1982 [JP] Japan ................. 57-160434

[51] Int. Cl.$^4$ .............. C09K 19/10; C09K 19/12; G02F 1/13
[52] U.S. Cl. .................. 252/299.1; 534/577; 534/829; 534/832; 350/349
[58] Field of Search ............ 534/577, 829, 832; 252/299.1; 350/349

[56] References Cited

U.S. PATENT DOCUMENTS

| | | | |
|---|---|---|---|
| 3,930,793 | 1/1976 | Birke et al. | 252/299.1 |
| 3,930,794 | 1/1976 | Birke et al. | 252/299.1 |
| 4,122,027 | 10/1978 | Cole, Jr. et al. | 252/299.1 |
| 4,128,497 | 12/1978 | Cole, Jr. et al. | 252/299.1 |
| 4,145,114 | 3/1979 | Coates et al. | 252/299.1 |
| 4,308,161 | 12/1981 | Aftergut et al. | 252/299.1 |
| 4,308,162 | 12/1981 | Cole, Jr. et al. | 252/299.1 |
| 4,308,163 | 12/1981 | Aftergut et al. | 252/299.1 |
| 4,308,164 | 12/1981 | Aftergut et al. | 252/299.1 |
| 4,350,603 | 9/1982 | Aftergut et al. | 252/299.1 |
| 4,359,398 | 11/1982 | Cole, Jr. et al. | 252/299.1 |
| 4,395,350 | 7/1983 | Boller et al. | 252/299.1 |
| 4,401,369 | 8/1983 | Jones | 252/299.1 |
| 4,426,312 | 1/1984 | Claussen | 252/299.1 |
| 4,588,517 | 5/1986 | Kaneko et al. | 252/299.1 |

FOREIGN PATENT DOCUMENTS

| | | | |
|---|---|---|---|
| 65869 | 12/1982 | European Pat. Off. | 252/299.1 |
| 76633 | 4/1983 | European Pat. Off. | 252/299.1 |
| 80153 | 6/1983 | European Pat. Off. | 252/299.1 |
| 87248 | 8/1983 | European Pat. Off. | 252/299.1 |
| 98522 | 1/1984 | European Pat. Off. | 252/299.1 |
| 52-2885 | 1/1977 | Japan | 252/299.1 |
| 53-75180 | 7/1978 | Japan | 252/299.1 |
| 56-57850 | 5/1981 | Japan | 252/299.1 |
| 56-104984 | 8/1981 | Japan | 252/299.1 |

OTHER PUBLICATIONS

Demus, D. et al., Flüssige Kristalle in Tabellen, veb Deutscher Verlag für Grundstoffindustrie, Leipzig, 1974, pp. 152, 156–159 & 219.

Cognard, J. et al., Mol. Cryst. Liq. Cryst., vol. 68, pp. 207–229 (1981).

Bloom, A. et al., Mol. Cryst. Liq. Cryst., vol. 40, pp. 213–221 (1977).

Cox, R. J., Mol. Cryst. Liq. Cryst., vol. 55, pp. 1–32 (1979).

*Primary Examiner*—Teddy S. Gron
*Assistant Examiner*—Eric Jorgensen
*Attorney, Agent, or Firm*—Burns, Doane, Swecker & Mathis

[57] ABSTRACT

New dichroic dyestuffs for the guest-host type liquid crystal and new liquid crystal compositions containing said dyestuff having an excellent improved dichroism and being prepared by introducing at least one group selected from the group consisting of phenyl, cyclohexyl, phenylcarbonyloxy and phenyloxycarbonyl group into a phenyl, a cyclohexyl or a naphthyl group at its 4-position, which is arranged at the end of a known dichroic dyestuff molecule along the major axis of the molecule.

8 Claims, No Drawings

DICHROIC DYESTUFFS FOR LIQUID CRYSTAL AND LIQUID CRYSTAL COMPOSITION

This application is a continuation of U.S. application Ser. No. 06/531,121 filed Sept. 9, 1983, now abandoned.

BACKGROUND OF THE INVENTION

The present invention relates to dichroic dyestuffs for guest-host type liquid crystals and to liquid crystal compositions containing these dyestuffs.

In a guest-host type color display using liquid crystals, a dichroic dyestuff is an essential and indispensable material and the quality of this kind of color display element completely depends upon the characteristics of the dyestuff used.

Under such circumstances, extensive research and development have been made on dichroic dyestuffs; as a result, dyestuffs which seem to be commerically acceptable have been proposed or developed. Typical examples of such dyestuffs include azo dyestuffs as disclosed in Japanese Patent Laid-Open Appln. Nos. 57850/1981, 104984/1981, 2885/1977, etc.

Investigations and developments have been extensively made on elements for guest-host type color displays from a variety of viewpoints, attempting to put these dyestuffs into practical use. Accordingly, it is highly expected that key importance will be attached to such elements in future color displays in terms of both the functionality and fashionability thereof. When compared to conventional color display techniques and peripheral techniques similar thereto which have already been put into practical use, however, such elements are not always better than conventional elements and require further improvements particularly in display characteristics.

Further, in display elements of this type, various modes are known. Among these are, for example, a mode in which one or two polarizing plates are employed and a mode of the so-called White-Taylor type in which no polarizing plate is employed. When the samd dyestuff is employed, the mode in which no polarizing plate is employed is inferior to the mode using a polarizing plate(s), particularly in contrast and appearance. Thus, further improvements in display characteristics are required also in this type.

SUMMARY OF THE INVENTION

Taking the existence of the prior art into account, the inventors have exhaustively carried out investigations so as to develop dyestuffs having more excellent dichroism and capable of being put into practical use, and thus completed the present invention.

A principal object of the present invention is to provide novel dichroic dyestuffs having excellent display characteristics.

Another object of the present invention is to provide liquid crystal compositions containing novel dichroic dyestuffs.

A further object of the present invention is to provide a method for improving dichroism of dyestuffs used in liquid crystals.

The foregoing and other objects of the present invention can be accomplished by introducing at least one group selected for the group consisting of the phenyl group, a cyclohexyl group, a phenylcarbonyloxy group or a phenyloxycarbonyl group into a phenyl group, a cyclohexyl group or a naphthyl group at 4-position thereof, which is located at the terminal position of said dichroic dyestuff molecule along the longitudinal axis thereof.

DETAILED EXPLANATION OF THE INVENTION

The dichroic dyestuffs according to the present invention may be represented by the following general formula [I]:

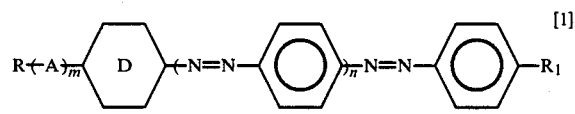

where R represents hydrogen; a linear or branched alkyl or alkoxy; nitro; cyano; a trihalomethyl; a halogen; a sulfonyl substituted by an alkyl, a dialkylamino or a trihalomethyl; an alkylcarbonyloxy; an alkyloxycarbonyl; an alkyloxycarbonyloxy; a carbonyloxy, an oxycarbonyloxy or an oxycarbonyl having a phenyl, a biphenyl, a cyclohexylphenyl or a cyclohexylcyclohexyl which may not or may be substituted by an alkyl, an alkoxy, a trihalomethyl or a halogen; a phenyl, a cyclohexyl, a bicyclooctanyl, a pryimidinyl, a dioxanyl, a biphenyl, a cyclohexylphenyl, a bicyclooclanylphenyl or a cyclohexylcyclohexyl which may be substituted by an alkyl, an alkoxy, a trihalomethyl or a halogen; $R_1$ represents hydrogen; an alkyl; an alkoxy; cyano; nitro; a trihalomethyl; a halogen; a sulfonyl substituted by an alkyl, a dialkylamino or a trihalomethyl; $R_2$ or $R_2$—B [$R_2$ represents a cyclohexanecarbonyloxy or a phenylcarbonyloxy group (the cyclohexane moiety is preferably in trans form) which may also have a substituent, at the 4-position, such as an alkyl, an alkoxy, a phenyl, a cyclohexyl or a bicyclooctanyl unsubstituted or substituted, at the 4-position, by an alkyl, an alkoxy, an alkylcarbonyloxy, an alkyloxycarbonyloxy, or

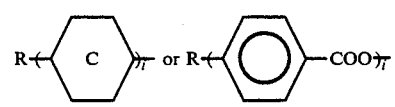

wherein R is the same as defined above, i is a small integer and C represents the ring being saturated or unsaturated; and B represents

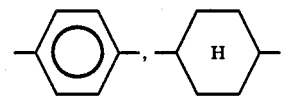

(divalent cyclohexane),

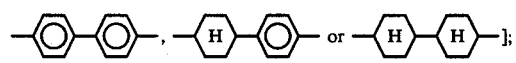

a phenyl, a cylochexyl or a bicyclooctanyl unsubstituted or substituted, at its 4-position, by an alkyl, an alkoxy, an alkylcarbonyloxy, an alkyloxycarbonyl, an alkyloxycarbonyloxy, a 4-alkyl or alkoxy substituted phenyl, cyclohexyl or bicyclooctanyl; a mono- or dialkyl amino; an alkylcarbonyloxy; an alkyloxycarbonyloxy; an alkyloxycarbonyl; a heterocyclic such as pyrrolidino, julolidino, piperazino, 2,6-pyrimidinyl, 2,6-dioxanyl; m is a small integer; n is o or an integer of 1 to 4; A is

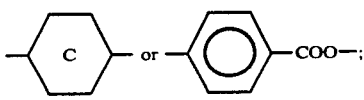

and D means the ring being saturated or unsaturated.

In the general formula [1], the substituent "alkyl" or "alkoxy" and "alkyl" or "alkoxy" moiety of the substituent are preferably a linear alkyl or alkoxy having 1 to 12 carbon atoms.

The preferred R is hydrogen; a linear $C_1$ to $C_{12}$ alkyl or alkoxy; trifluoromethyl; a halogen; a linear $C_1$ to $C_{12}$ alkylcarbonyloxy, alkyloxycarbonyl or alkyloxycarbonyloxy; a carbonyloxy, oxycarbonyl or oxycarbonyloxy having a phenyl, a biphenyl, a cyclohexylphenyl or cyclohexylcyclohexyl which may be unsubstituted or substituted by a linear $C_1$ to $C_{12}$ alkyl or alkoxy, a trifluoromethyl or a halogen; a phenyl, a cyclohexyl, a 2,6-pyrimidinyl, a 2,6-dioxanyl, a bicyclootanyl, a biphenyl, a cyclohexylphenyl, a bicyclooctanylphenyl or a cyclohexylcyclohexyl substituted by an alkyl, an alkoxy, an alkylcarbonyloxy or an alkyloxycarbonyloxy.

The preferred substituent $R_1$ is hydrogen; a linear $C_1$ to $C_{12}$ alkyl or alkoxy; $R_2$ or $R_2-B$ in which $R_2$ is a cyclohexanecarbonyloxy or a phenylcarbonyloxy unsubstituted or substituted, at the 4-position, by a linear $C_1$ to $C_{12}$ alkyl or alkoxy, or a phenyl or a cyclohexyl unsubstituted or substituted, at the 4-position, by a linear $C_1$ to $C_{12}$ alkyl, alkoxy, alkylcarbonyloxy or alkyloxycarbonyloxy, or

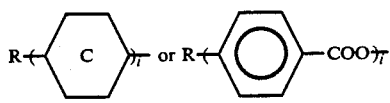

wherein R is one of the preferred substituents of R defined above, i and c are the same as defined above, and B has the same meaning as before; a phenyl or a cyclohexyl unsubstituted or substituted, at the 4-position, by a linear $C_1$ to $C_{12}$ alkyl, alkoxy, alkylcarbonyloxy, alkyloxycarbonyl or alkyloxycarbonyloxy, or a 4-linear $C_1$ to $C_{12}$ alkyl or alkoxy substituted phenyl or cyclohexyl; a mono- or di-linear $C_1$ to $C_{12}$ alkylamino; a linear $C_1$ to $C_{12}$ alkylcarbonyloxy, alkyloxycarbonyloxy or alkyloxycarbonyl; a heterocyclic selected from pyrrolidino, julolidino or N-alkylsubstituted piperazino.

In the general formula [I], any one of the benzene rings may be condensed with a benzene ring at its 2 positions to form a naphthalene structure and/or the benzene ring may be substituted, at its vacant site, with a lower alkyl such as methyl or ethyl, a lower alkoxy group, a trihalomethyl group, hydroxy group or a halogen such as fluorine, chlorine, bromine, iodine.

In addition to the dyestuffs disclosed above, azo dyes containing an azomethine group or a styryl group as a part of the dye molecule are also applicable to the present invention.

These azo dyes of the present invention may be prepared according to conventional methods as disclosed in Japanese Patent Laid-Open Appln. Nos. 57850/1981, 104984/1981, 2885/1977 etc. The part of the dyes of the general formula [I] may also be prepared by an ester formation reaction which comprises reacting precursor of the corresponding subject dye, having hydroxy group, carboxy group or a carbonyl halide, with a compound needed to form an ester bond. In the dyestuffs represented by the formula [1], the constituents of the dyestuff,

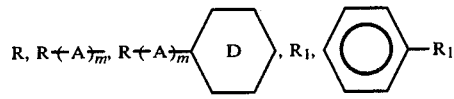

may be a liquid crystal compound or a starting material or a intermediate for synthesizing the liquid crystal compound or they may be prepared by chemically modifying the liquid crystal compound or the starting material or the intermediate thereof. The dyes prepared according to the method mentioned above may be highly purified by means of column chromatography, recrystallization or the like and put into practical use.

By the use of dyestuffs having excellent dichroism according to the invention, the quality of a display using guest-host mode is markedly improved and enhanced, and this promotes the practical use of such techniques. Further, properties of the display can be much more improved within the scope of techniques already employed in a practical use.

According to the present invention, new liquid crystal compositions are also provided. Such composition may simply be prepared by mixing a dyestuff of the invention and any one of the conventional liquid crystals which may be used as a host in a guest-host type liquid crystal.

In such composition, dichroic dyestuffs are generally employed in an amount of 0.01 to 20 wt.%, preferably 0.1 to 5 wt.%, based on the host liquid crystal. However, the amount may, of course, vary depending upon the purpose of use, method, host liquid crystal or the like. The dichroic dyestuffs in accordance with the present invention are also employed within such a range.

The dyestuffs in accordance with the present invention can be employed singly or in combination. Further, the dichroic dyestuffs can also be employed in combination with other dyestuffs having no dichroism, optically active substances and other additives. These dyestuffs are applicable to any liquid crystal such as Schiff, biphenyl, azo, cyclohexylcyclohexane, phenylcyclohexane and ester and the dyestuffs having a substituent phenyloxycarbonyl or phenylcarbonyloxy are effectively used in ester liquid crystals in the light of their sturucture. Liquid crystals can be any of nematic type, cholesteric-nematic phase transition type, smectic type, etc. An application to any mode based on dielectric anisotropy of liquid crystal is possible.

The present invention will be explained more in detail referring to the following examples. The examples of the dichroic dyestuff according to the present invention are shown in Table 1 below, together with maximum absorption wavelength λm in chloroform, the color of the dyestuffs in the biphenyl mixed liquid crystal GR-41 (manufactured by Chisso Co., Ltd.) and the dichroic ratio D thereof.

PREPARATION (1) Dyestuff No. 1

2.4 g of 4-[4-(4'-butyl biphenylazo)-naphthylazo]-phenol was added to a solution of 0.3 g of sodium hydroxide in 30 ml of ethyl alcohol and 1 g of ethyl iodide was added to the solution, then the solution was refluxed under heating for 7 hours. The resulting crystals were filtered off, washed with water, then with alcohol and dried to obtain a crude dyestuff. The crude dyestuff was purified by a column of silica gel-benzene and 1.2 g of the objective dyestuff (m.p. 133° C.) was obtained.

(2) Dyestuff No. 2

1.9 g of 4-(4'-butyl biphenylazo)-naphthylamine was dissolved in 5 ml of dimethylformamide and the solution was sufficiently stirred after adding 10 ml of concentrated HCl and 20 ml of water. The solution was cooled to 0° to 5° C. and 2 ml of aqueous solution containing 0.4 g sodium nitrite was added dropwisely before stirring the solution at that temperature for 2 hours, then 15 g of sodium acetate was added and the reaction was continued for 1 hour. The crystals obtained was filtered off, washed with water, then with methanol, dried to obtain a crude dyestuff. The crude dyestuff was purified by the use of a column of silica gel-chloroform and 0.5 g of the objective dyestuff (m.p. 189° C.) was obtained.

(3) Dyestuff No. 6

1.8 g of 4-(4'-amyloxy biphnylazo)-aniline was dissolved in 10 ml of dimethylformamide and the solution was sufficiently stirred after adding 20 ml of concentrated HCl and 20 ml of water. The mixture was cooled to 0° to 5° C. and 0.4 g of sodium nitrite in 20 ml of water was dropwisely added and thereafter the solution was stirred at that temperature for 1.5 hours. Then 1.1 g of N,N-dibutylaniline in 5 ml of acetic acid was dropwisely added, the reaction was continued for 2 hours, further 25 g of anydrous sodium acetate was added and reacted for 2 hours. The resulting crystal was filtered off, washed with water, then with methanol and dried to obtain a crude product. The crude product was purified by a column of silica gel-chloroform and 1.6 g of the objective dyestuff (m.p. 166° C.) was obtained.

(4) Dyestuff No. 19

A solution of 2 g of 4-[4-(4-butyl phenylazo)-phenylazo]-naphthol in 40 ml of anhydrous pyridine was cooled to 0° to 5° C., 1.2 g of 4-amyl bonzoilchloride was dropwisely added and the reaction was continued at that temperature for 2 hours. Then, the reaction solution was poured into 250 ml of methanol. After leaving to stand for a while, the resulting crystals were filtered off, washed with water, then with methanol and dried to obtain a crude product. The crude product was purified by a column of silica gel-benzene and 1.6 g of the subject dyestuff (m.p. 154° C.) was obtained.

Other dyestuffs of the invention may, of course, be prepared according to the same procedure described above.

TABLE 1

| Dyestuff No. | Formula | $\lambda m(n.m)$ | Color | D |
|---|---|---|---|---|
| 1 | $H_9C_4$—〈Ph〉—〈Ph〉—N=N—〈Naph〉—N=N—〈Ph〉—$OC_2H_5$ | (443) | yellow orange | 10.1 |
| 2 | $H_9C_4$—〈Ph〉—〈Ph〉—N=N—〈Naph〉—N=N—〈Ph〉—$N(CH_3)_2$ | (520) | reddish purple | 10.7 |
| 3 | $H_{11}C_5$—〈H〉—〈Ph〉—N=N—〈Naph〉—N=N—〈Ph〉—$N(CH_3)_2$ | (519) | reddish purple | 10.7 |
| 4 | $H_{11}C_5$—〈Ph〉—〈Ph〉—N=N—〈Ph〉—N=N—〈Ph〉—$N(C_4H_9)_2$ | (499) | red | 11.3 |
| 5 | Br—〈Ph〉—〈Ph〉—N=N—〈Ph〉—N=N—〈Ph〉—$N(C_4H_9)_2$ | (503) | red | 11.2 |
| 6 | $H_{11}C_5O$—〈Ph〉—〈Ph〉—N=N—〈Ph〉—N=N—〈Ph〉—$N(C_4H_9)_2$ | (500) | red | 11.2 |
| 7 | $H_{11}C_5$—〈Ph〉—COO—〈Ph〉—N=N—〈Ph(CH_3)〉—N=N—〈Naph〉—N=N—〈Ph〉—$N(C_2H_5)_2$ | (551) | bluish purple | 12.0 |

TABLE 1-continued

| Dyestuff No. | Formula | λm(n.m) | Color | D |
|---|---|---|---|---|
| 8 | H₉C₄—⟨⟩—⟨⟩—N=N—⟨⟩(CH₃)—N=N—⟨naphthalene⟩—N=N—⟨⟩—N(C₂H₅)₂ | (550) | bluish purple | 11.8 |
| 9 | H₉C₄—⟨⟩—(N=N—⟨⟩)₂—N=N—⟨⟩—OOC—⟨⟩—C₅H₁₁ | (399) | yellow | 13.6 |
| 10 | H₁₅C₇—⟨⟩—⟨⟩—COO—⟨⟩—N=N—⟨⟩(CH₃)—N=N—⟨⟩—N(C₂H₅)(C₂₂H₅) | (498) | red | 13.0 |
| 11 | H₁₅C₇—⟨H⟩—⟨⟩—COO—⟨⟩—N=N—⟨⟩(CH₃)—N=N—⟨⟩—N(C₂H₅)₂ | (496) | red | 13.0 |
| 12 | H₁₁C₅—⟨⟩—COO—⟨⟩—N=N—⟨⟩—N=N—⟨⟩—OC₇H₁₅ | (390) | yellow | 11.6 |
| 13 | H₁₇C₈—⟨⟩—COO—⟨⟩—N=N—⟨⟩(CH₃)—N=N—⟨⟩(CH₃)—N=N—⟨⟩—C₄H₉ | (401) | yellow | 11.3 |
| 14 | H₅C₂—OC—O—⟨⟩—N=N—⟨naphthalene⟩—N=N—⟨⟩—⟨⟩—C₄H₉ | (435) | yellow | 10.0 |
| 15 | H₁₅C₇OCOO—⟨⟩—⟨⟩—N=N—⟨naphthalene⟩—N=N—⟨⟩—N(CH₃)₂ | (520) | red | 10.4 |
| 16 | H₁₁C₅O—⟨⟩—OCO—⟨⟩—N=N—⟨⟩—N=N—⟨⟩—OC₃H₇ | (390) | yellow | 11.6 |
| 17 | H₁₁C₅—⟨⟩—⟨⟩—N=N—⟨naphthalene⟩—N=N—⟨⟩—OOC—⟨H⟩—C₂H₅ | (440) | yellowish orange | 12.7 |
| 18 | H₁₁C₅—⟨⟩—⟨⟩—N=N—⟨naphthalene⟩—N=N—⟨⟩—OOC—⟨⟩—⟨⟩—C₇H₁₅ | (440) | yellowish orange | 13.5 |
| 19 | H₉C₄—⟨⟩—N=N—⟨⟩—N=N—⟨naphthalene⟩—OOC—⟨⟩—C₅H₁₁ | (407) | yellow | 10.0 |
| 20 | H₁₁C₅—⟨⟩—⟨⟩—⟨⟩—COO—⟨⟩—N=N—⟨naphthalene⟩—N=N—⟨⟩—N(C₇H₁₅)₂ | (527) | red | 12.3 |
| 21 | H₉C₄—⟨⟩—N=N—⟨⟩—N=N—⟨naphthalene⟩—N=N—⟨⟩—OCO—⟨⟩—⟨H⟩—C₇H₁₅ | (445) | yellowish orange | 13.8 |

TABLE 1-continued

| Dyestuff No. | Formula | λm(n.m) | Color | D |
|---|---|---|---|---|
| 22 | 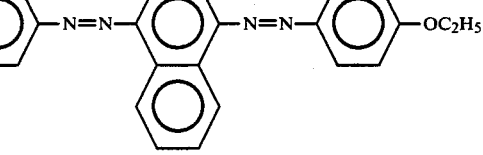 | (440) | yellowish orange | 12.7 |

The values of the dichloic ratio listed in Table 1 were determined by dissolving each dyestuff of the invention in GR-41, enclosing the solution between two glass base plates equipped with transparent electrodes, homogeneously orientating the dyestuff molecule therein, and then measuring the absorbance in both the direction of the major and minor axes with respect to the wavelength at which the dyestuff concerned shows the maximum absorption when a linear polarized light having electric field parallel to and vertical to said orientated direction of the molecule and calculating the ratio between the values of absorbance. The dichroic ratio may vary to some extent depending on the properties of the host-liquid crystal and the concentration of the dichroic dyestuff used.

The following reference examples may serve to explain the present invention.

For the purpose of comparison, known dyestuffs similar to the dyestuffs shown in Table 1 are given in Table 2 below, together with the characteristics thereof.

TABLE 2

| Comparative Dyestuff No. | Formula | λm (n.m) | Color | D |
|---|---|---|---|---|
| 1 | 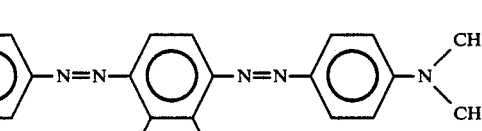 | (435) | yellow orange | 8.4 |
| 2 | 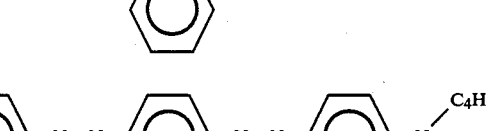 | (513) | reddish purple | 9.0 |
| 3 | 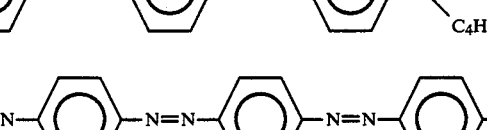 | (495) | red | 9.4 |
| 4 | 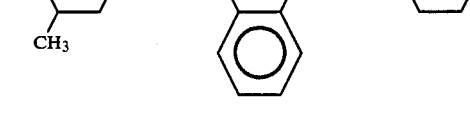 | (548) | bluish purple | 10.0 |
| 5 |  | (408) | yellow | 11.7 |

The dichroic ratios given in Table 2 were determined as described above.

As is clar from comparison of Table 1 with Table 2, the dichroic property of the dyestuffs can be markedly improved by introducing, for example, a phenyl group, a cyclohexyl group, a phenylcarbonyloxy group or a phenyloxycarbonyl which may be substituted with an appropriate substituent, into the 4-position of the phenyl or naphtyl group located at the terminal position of the dichroic dyestuffs molecule along its longitudinal axis.

These differences in dichroism are significant in the art; not only the representative examples described above but also other dyestuffs of the present invention have significant differences in dichroism. If one of the specific groups according to the present invention is introduced in the phenyl group (or cyclohexyl group being also possible) or naphthyl group located at the terminal position of a dyestuff molecule, the introduction of said specific group makes it possible to elongate the length of the so-called "rigid skeleton" used conventionally, and this is preferred in improving dichroism. The specific group may also be introduced at both terminal positions of a dyestuff molecule and thereby the dichroism of the dyestuff may be further improved. While the substituents bonded to these specific groups, such as alkyl groups, alkoxy groups or other subtituents which do not constitute a part of the so-called "rigid skeleton", affect the absorption characteristics, solubility, etc. They do not, however, contribute to improving dichroism, compared with said specific substituents.

To put dyestuffs to practical use in guest-host type display elements, it is extremely important to develop dyestuffs having improved dichroism. Investigations and development have thus been continuously made ever since investigations for practical use started, which is obvious from the history of these investigations. Investigations on azo dyes started from mono-azo dyestuffs and interest then shifted from bis-azo to tris-azo dyestuffs. Now dyestuffs suited for practical use have been found among bis-azo or tris-azo dyestuffs. With the increasing number of azo groups, there is a tendency for various kinds of problems to arise, such as an increase in the number of preparation steps, a need for complicated production conditions, a reduction in yield, a reduction in adaptability of the resulting dichroic dyestuff, and therefore there is a risk that dyestuffs having more than 4 or 5 azo groups may be impractical.

According to the present invention, the dichroic ratio may easily be improved by more than 1.5 to 2.0, by introducing a specific group into 4-position of a phenyl (or a cyclohexyl is also possible) group or a naphthyl group located at the terminal position of the dyestuff molecule along its longitudinal axis. If the specific groups are introduced at both terminal positions of the dyestuff molecule, the dichroism thereof may further be improved. Therefore, it is possible, according to the present invention, to enhance the dichroism of the dyestuffs without the complicated, difficult operations required in improving dichroism by increasing the number of azo groups. For example, in cases of tris-azo dyestuffs, it is possible to obtain dyestuffs having a dichroism substantially equivalent to those having 4, 5 or more of azo groups.

Thus, according to the present invention, dichroism of dichroic dyestuffs can easily be improved and novel dyestuffs having excellent dichroism can be provided. Accordingly, display qulaity in guest-host type liquid crystal which was inferior in quality to other displays can be improved and practical use of this type can be promoted. In addition, the present invention can cope with varius applications and techniques and greatly contributes to color display by liquid crystals.

What is claimed is:

1. A dichroic dyestuff of the general formula:

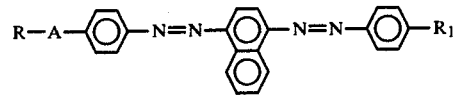

wherein A represents

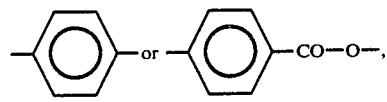

and if A is

R is alkyl and $R_1$ is alkoxy or alkylcarbonyloxy; and if A is

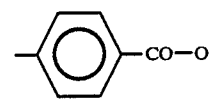

R is para-alkylbiphenyl and
$R_1$ is para-alkylphenyl or dialkylamino.

2. The dichroic dyestuff of claim 1 of the formula:

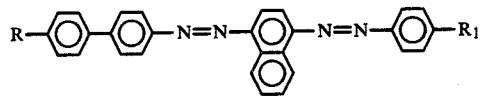

wherein R is alkyl
and $R_1$ is alkoxy or alkylcarbonyloxy.

3. The dichroic dyestuff of claim 1 of the formula:

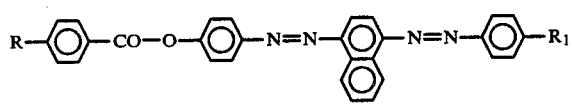

wherein R is para-alkylbiphenyl, and $R_1$ is para-alkylphenyl or dialkylamino.

4. The dichroic dyestuff of claim 1 of the formula:

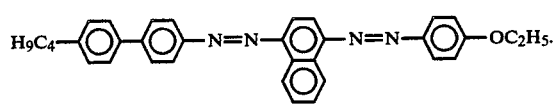

5. The dichroic dyestuff of claim 1 of the formula:

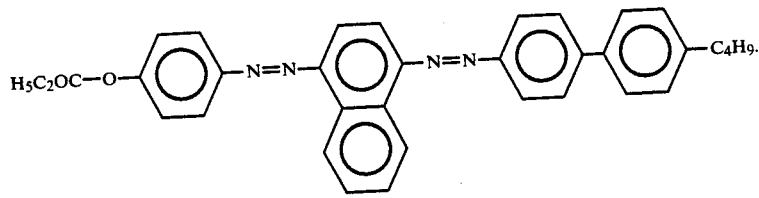

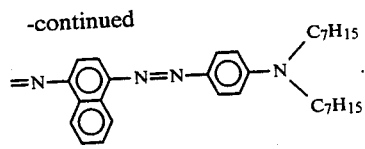
15

6. The dichroic dyestuff of claim 1 of the formula:

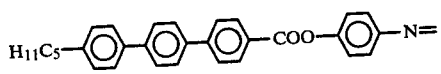

7. A liquid crystal composition for guest-host liquid color display which comprises at least one dichroic dyestuff as guest and liquid crystal as host, characterized in that the dichroic dyestuff is selected from the compounds as defined in claim 1.

8. The liquid crystal composition of claim 7, wherein the liquid crystal is selected from the group consisting of biphenyl, cyclohexylcyclohexane, phenylcyclohexane and ester liquid crystals of nematic type, cholesteric-nematic phase transition type, or smectic type.

* * * * *